A. C. SULLIVAN AND J. W. GILL.
TWO SPEED DIRECT DRIVE LOGGING ENGINE.
APPLICATION FILED JAN. 12, 1921.

1,394,451.

Patented Oct. 18, 1921.
2 SHEETS—SHEET 1.

Inventor
Allan C. Sullivan
Joseph W. Gill

A. C. SULLIVAN AND J. W. GILL.
TWO SPEED DIRECT DRIVE LOGGING ENGINE.
APPLICATION FILED JAN. 12, 1921.

1,394,451. Patented Oct. 18, 1921.
2 SHEETS—SHEET 2.

Inventor
Allan C. Sullivan
Joseph W. Gill by [signature]
Atty.

UNITED STATES PATENT OFFICE.

ALLAN C. SULLIVAN AND JOSEPH W. GILL, OF PORTLAND, OREGON, ASSIGNORS TO SMITH & WATSON IRON WORKS, A CORPORATION OF OREGON.

TWO-SPEED DIRECT-DRIVE LOGGING-ENGINE.

1,394,451.　　　　Specification of Letters Patent.　　Patented Oct. 18, 1921.

Application filed January 12, 1921. Serial No. 436,693.

*To all whom it may concern:*

Be it known that we, ALLAN C. SULLIVAN and JOSEPH W. GILL, citizens of the United States, and residents of the city of Portland, county of Multnomah, and State of Oregon, have invented a certain new and useful Improvement in Two-Speed Direct-Drive Logging-Engines, of which the following is a specification.

The object of our invention is to provide a compound geared two speed instantaneous change logging or hoisting engine, so devised that the power may be transmitted to a main drum and an auxiliary or trip drum directly from the source of power such as the pinion shaft or crank shaft; and preferably through an intermediate shaft normally not revolved but thrown into service through the operation of suitable friction clutches through which the change of speeds of the main drum is effected.

Our object in mounting the main drum and the auxiliary drum upon a common shaft is to avoid the fouling or entanglement of the lines or cables which are spooled or reeved upon the drums respectively.

Our power transmitting means are furthermore so arranged as to drive the main and the auxiliary or trip drums in the same direction.

Furthermore we have so arranged the shafts and drums of our engine that while the power is applied direct from the source no high or unstable frames or brackets are required for the shaft bearings Furthermore we have excluded all manner of loose or floating gears which are thrown into action by being moved axially along the shaft.

Furthermore all shafts extend completely across the frame and the latter preferably comprises three parallel longitudinal members thus providing three bearings for the shafts adapted to insure stability and alinement under stress. Furthermore all shafts of our engine lie approximately in a common horizontal plane, thereby providing accessibility to the parts for adjustment as required for wear and also for replacement in case of breakage.

Figure 1:
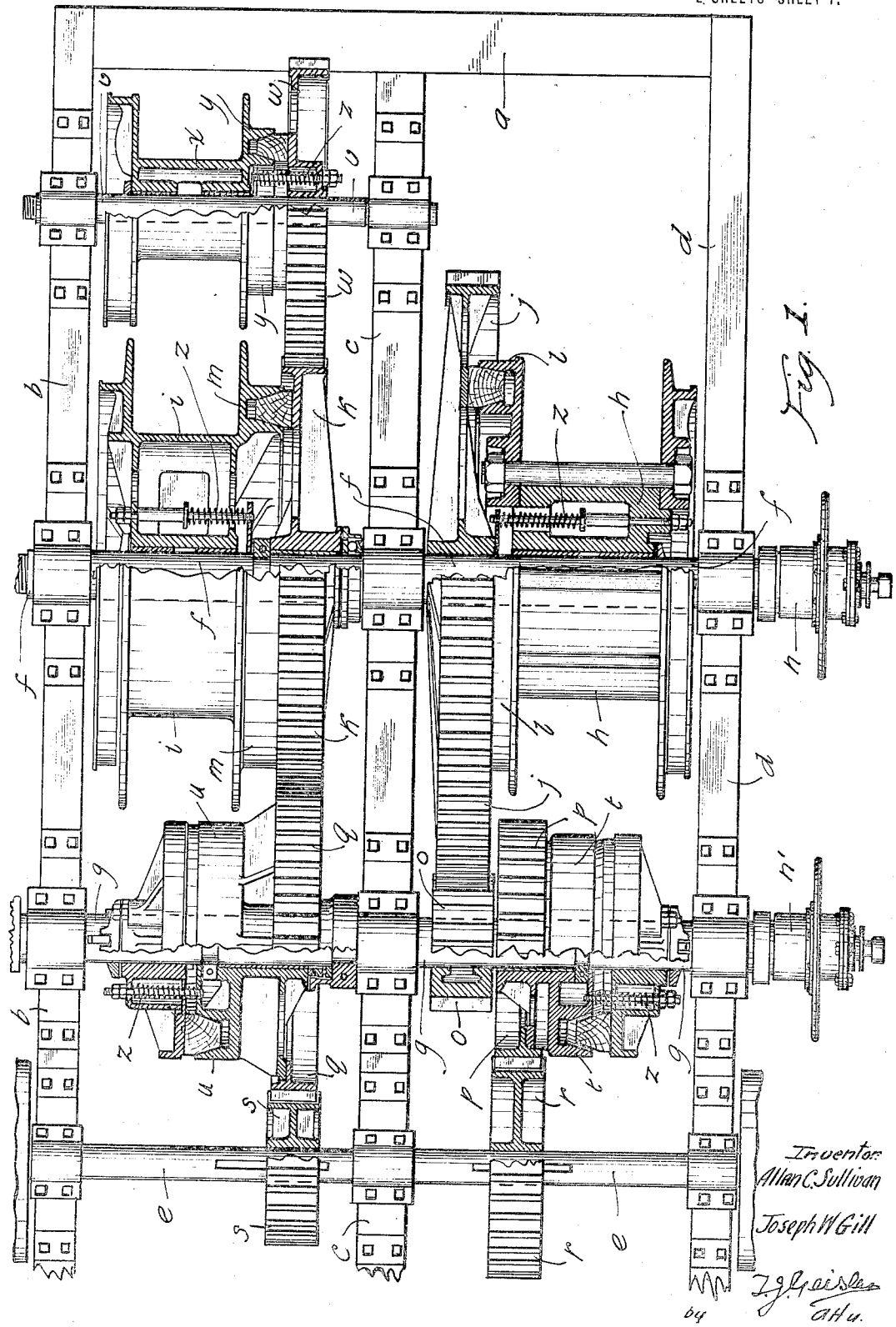
Figure 2:
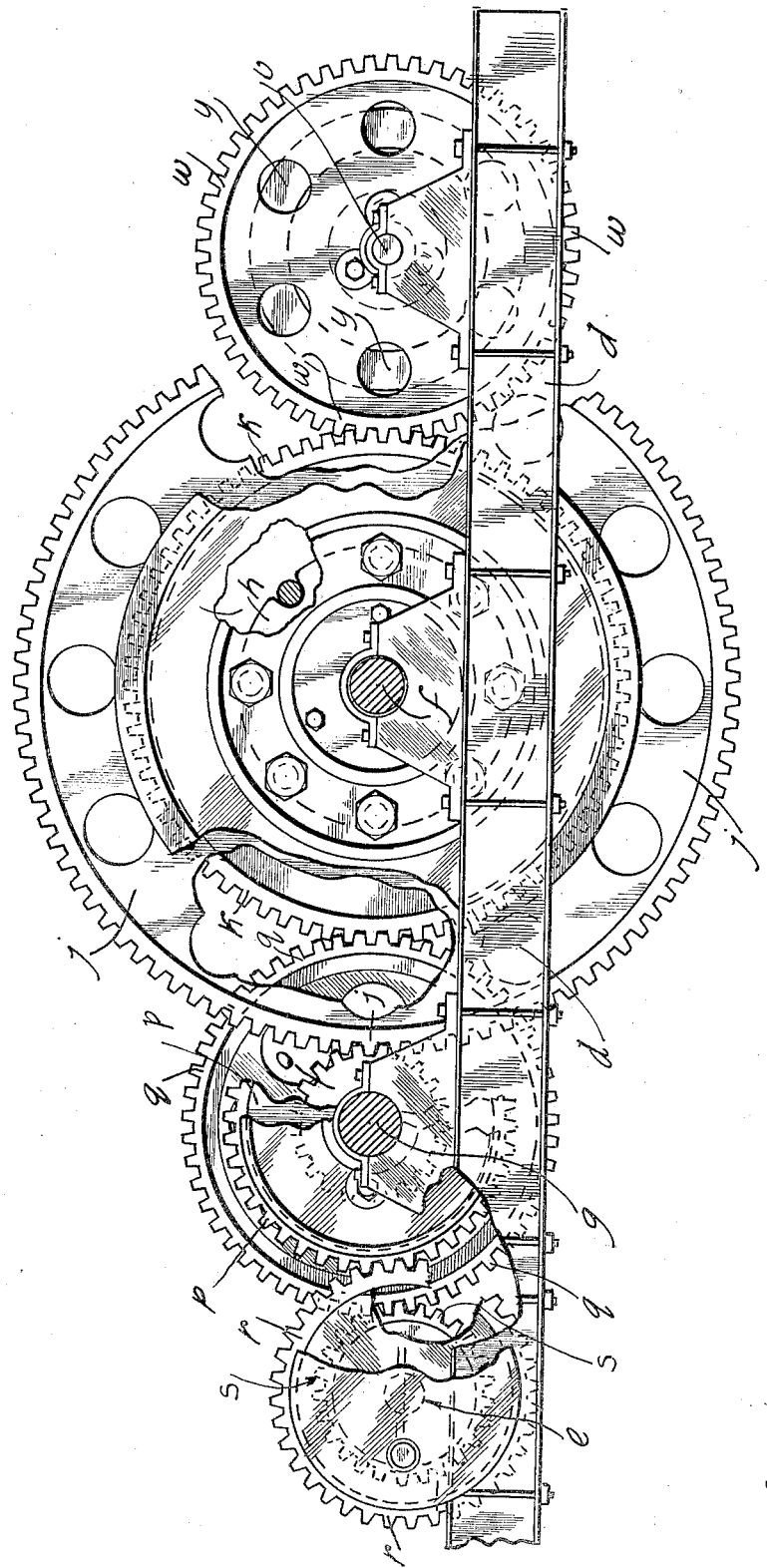

Referring now to the accompanying drawings, as illustrating the principles of construction and arrangement embodied in our invention;

Figure 1 is a partial plan view of our invention with parts broken away and other parts shown in section, the means for driving the drive shaft not being shown and it is to be understood that such means as convenient are to be employed for that purpose; and Fig. 2 is a side elevation of our engine with parts broken away and other parts shown in section.

The frame $a$ is preferably made to include three longitudinal parallel members as $b$, $c$, and $d$. In the frame is journaled a drive shaft $e$, a driven shaft $f$ and an intermediate shaft $g$. On the driven shaft $f$ are mounted side by side and on the opposite sides of the frame member $c$, a main drum $h$, and an auxiliary or trip drum $i$, said drums being loose on the shaft $f$. Adjacent the main drum $h$, there is loosely mounted on the shaft $f$ a gear $j$, and adjacent the auxiliary drum $i$ is mounted a gear $k$. Means are provided for operatively connecting either of said drums with their gears, such means preferably consisting of friction clutches as shown in $l$ and $m$. The friction clutches are applied by any convenient hand or steam operated devices. For example such devices as shown at $n$ and $n'$ which represent that type of clutch control shown in the patent to H. L. Turney, dated Dec. 15, 1908, No. 906,585. It is to be understood that similar clutches are to be provided at both sides of our engine.

On the intermediate shaft $g$ is mounted a fixed pinion $o$, meshing with the gear $j$ and loose gears $p$, $q$, meshing respectively with the gear train elements $r$ and $s$ fast on the driving shaft $e$.

Friction clutches $t$ and $u$ are provided and operatively connect either of the gears $p$ or $q$ with the intermediate shaft $g$.

As will be noted the gear $q$ of the intermediate shaft is in mesh with the gear $k$ on the driven shaft $f$ and thus the latter gear will be constantly driven when the drive shaft is in action.

The gear $j$ however, will only be driven when one or other of the gears $p$ or $q$ carried by the intermediate shaft $g$ is operatively connected with the latter by the operation of its related clutch element $n'$ and of course the speed transmitted to the gear $j$ of the main drum will be relative to which of the gears $p$ or $q$ is used as the transmitting element in the gear train.

Where a second auxiliary or straw drum is desired there will be journaled in the frame a shaft $v$ carrying a gear $w$ for operating the second auxiliary drum $x$ through the medium of a friction clutch $y$.

In each of the examples of friction clutches given in the drawings the devices are so arranged that the friction clutch will automatically become disengaged by the use of the spring as $z$ and thus rendered inactive as soon as released from the means provided for applying a friction clutch.

As already mentioned, we have preferably so designed our engine that the change of speed is made through an intermediate shaft because the rotational speed of the latter is not as high as the drive or crank shaft.

The clutch devices employed for connecting the gear train members mounted on the intermediate shaft should be so devised that when one of such members is connected with the intermediate shaft the other is simultaneously disconnected therefrom, such devices, however, being well known, we did not deem it necessary to enlarge upon the details of construction thereof.

Another essential feature of our invention is as already before noted, that all members of the gear trains are in constant mesh with each other, thus eliminating all axial movement of any gear train member.

From the foregoing description it will now be apparent that the essential part of our invention consists in providing for the main drum gear two direct drive different speeds, gear trains connecting the driving shaft with said main drum gear, the gear trains, however, being normally inoperative to affect the driving of said main drum, one of said gear trains driving the auxiliary drum at constant speed, and we provide means for placing either of said gear trains in the state for driving said main drum gear.

By the term "main drum" we refer to that one of the two drums provided in our engine which is to be run at different speeds.

The construction of parts illustrated in the drawings but not specifically described will be self-suggesting to any engineer or builder familiar with the art to which our invention relates and the illustration and description of our invention is to be understood as being intended to represent the form of construction by which we prefer to carry our invention into practice leaving it to other builders to make such variations as they may prefer, not departing from the principle of our invention.

We claim:

1. In an engine of the character described, a driven shaft, a main drum and an auxiliary drum loose on such shaft, a gear adjacent each drum, means for operatively connecting either of said drums with its gear, a driving shaft, two different speed gear trains in constant mesh connecting the driving shaft with said main drum gear, said gear trains being normally inoperative to drive said main drum, one of said gear trains driving the auxiliary drum at constant speed, and means for placing either of said gear trains in the state for driving said main drum gear.

2. In an engine of the character described, a driven shaft, a main drum and an auxiliary drum loose on such shaft, a gear adjacent each drum, means for operatively connecting either of said drums with its gear, a driving shaft, two different speed gear trains in constant mesh connecting the driving shaft with said main drum gear, said gear trains including an intermediate shaft carrying members of said gear trains, and a pinion fast on the latter shaft in mesh with said main-drum gear, said gear trains normally not driving said intermediate shaft, and means for operatively connecting either of said gear trains with said intermediate shaft.

3. In an engine of the character described, a driven shaft, a main drum and an auxiliary drum loose on such shaft, a gear adjacent each drum, means for operatively connecting either of said drums with its gear, a driving shaft, lying approximately in the same horizontal plane as said driven shaft, two different speed gear trains in constant mesh connecting the driving shaft with said main drum gear, said gear trains being normally inoperative to drive said main drum, one of said gear trains driving the auxiliary drum at constant speed, and means for placing either of said gear trains in the state for driving said main drum gear.

4. In an engine of the character described, a frame comprising parallel longitudinal members, a driving shaft, a driven shaft, and an intermediate shaft journaled in said frame and extending completely across, from side to side of the frame, a main drum and an auxiliary drum loose on said driven shaft, a gear adjacent of each of said drums, means for operatively connecting either of said drums with its gear, two different speed gear trains in constant mesh connecting the driving shaft with said main-drum gear, members of said gear trains being mounted on said intermediate shaft and in mesh with said main drum gear, said gear train being normally inoperative to drive said intermediate shaft, means for placing either of said gear trains in the state for driving said intermediate shaft, one of said gear trains driving the auxiliary-drum gear at constant speed.

5. In an engine of the character described, a frame comprising parallel longitudinal members, a driving shaft, a driven shaft, and an intermediate shaft journaled in said frame and extending completely across, from side to side of the frame, said shafts lying approximately in a common horizontal plane, a main drum and an auxiliary drum loose on said driven shaft, a gear adjacent each of said drums, means for operatively connecting either of said drums with its gear, two different speed gear trains in constant mesh connecting the driving shaft with said main-drum gear, members of said gear trains being mounted on said intermediate shaft and in mesh with said main drum gear, said gear train being normally inoperative to drive said intermediate shaft, means for placing either of said gear trains in the state for driving said intermediate shaft, one of said gear trains driving the auxiliary-drum gear at constant speed.

6. In an engine of the character described, a frame comprising parallel longitudinal members, a driving shaft, a driven shaft, and an intermediate shaft journaled in said frame, a main drum and an auxiliary drum loose on said driven shaft, a gear adjacent each drum, means for operatively connecting either of said drums with its gear, fixed gears on said driving shaft, loose gears on said intermediate shaft in mesh with said fixed gears of the driving shaft, said meshing gears being of different gear ratio, a fixed pinion on the intermediate shaft in mesh with the gear of said main drum, the gear of the auxiliary drum being in mesh with one of the loose gears on said intermediate shaft, and means for operatively connecting either of said loose gears on the intermediate shaft with the latter.

7. In an engine of the character described, a frame comprising parallel longitudinal members, a driving shaft, a driven shaft, and an intermediate shaft journaled in said frame and extending completely across, from side to side of, the frame, a main drum and an auxiliary drum loose on said driven shaft, a gear adjacent each drum, means for operatively connecting either of said drums with its gear, fixed gears on said driving shaft, loose gears on said intermediate shaft in mesh with said fixed gears of the driving shaft, said meshing gears being of different gear ratio, a fixed pinion on the intermediate shaft in mesh with the gear of said main drum, the gear of the auxiliary drum being in mesh with one of the loose gears on said intermediate shaft, and means for operatively connecting either of said loose gears on the intermediate shaft with the latter.

8. In an engine of the character described, a frame comprising parallel longitudinal members, a driving shaft, a driven shaft, and an intermediate shaft journaled in said frame and extending completely across, from side to side of, the frame, said shafts lying approximately in a common horizontal plane, a main drum and an auxiliary drum loose on said driven shaft, a gear adjacent each drum, means for operatively connecting either of said drums with its gear, fixed gears on said driving shaft, loose gears on said intermediate shaft in mesh with said fixed gears of the driving shaft, said meshing gears being of different gear ratio, a fixed pinion on the intermediate shaft in mesh with the gear of said main drum, the gear of the auxiliary drum being in mesh with one of the loose gears on said intermediate shaft, and means for operatively connecting either of said loose gears on the intermediate shaft with the latter.

ALLAN C. SULLIVAN.
JOSEPH W. GILL.